(12) United States Patent
Kawabe et al.

(10) Patent No.: US 9,606,465 B2
(45) Date of Patent: Mar. 28, 2017

(54) PROPYLENE/ALPHA-OLEFIN COPOLYMER AND USES THEREOF

(71) Applicant: Mitsui Chemicals, Inc., Minato-ku, Tokyo (JP)

(72) Inventors: Kuniaki Kawabe, Chiba (JP); Hirotaka Kanaya, Chiba (JP); Toshiyuki Ito, Ichihara (JP); Kan Komiya, Singapore (SG)

(73) Assignee: MITSUI CHEMICALS, INC., Tokyo (JP)

( * ) Notice: Subject to any disclaimer, the term of this patent is extended or adjusted under 35 U.S.C. 154(b) by 207 days.

(21) Appl. No.: 14/387,090

(22) PCT Filed: Mar. 22, 2013

(86) PCT No.: PCT/JP2013/058348
§ 371 (c)(1),
(2) Date: Sep. 22, 2014

(87) PCT Pub. No.: WO2013/146605
PCT Pub. Date: Oct. 3, 2013

(65) Prior Publication Data
US 2015/0056548 A1 Feb. 26, 2015

(30) Foreign Application Priority Data
Mar. 28, 2012 (JP) ................................ 2012-074450

(51) Int. Cl.
G03G 9/09 (2006.01)
C08F 10/08 (2006.01)
C08F 210/06 (2006.01)
G03G 9/087 (2006.01)

(52) U.S. Cl.
CPC ........... *G03G 9/0904* (2013.01); *C08F 10/08* (2013.01); *C08F 210/06* (2013.01); *G03G 9/08704* (2013.01); *G03G 9/08795* (2013.01); *G03G 9/08797* (2013.01)

(58) Field of Classification Search
CPC .............................. G03G 9/0904; C08F 10/08
See application file for complete search history.

(56) References Cited

U.S. PATENT DOCUMENTS

| | | | |
|---|---|---|---|
| 4,777,104 A | 10/1988 | Matsumoto et al. | |
| 4,892,851 A | 1/1990 | Ewen et al. | |
| 4,952,649 A | 8/1990 | Kioka et al. | |
| 4,971,937 A | 11/1990 | Albizzati et al. | |
| 5,036,034 A | 7/1991 | Ewen | |
| 5,051,331 A * | 9/1991 | Sakashita ........... | G03G 9/08711 430/108.8 |
| 5,081,322 A * | 1/1992 | Winter ................ | C08F 210/06 526/127 |
| 5,346,797 A | 9/1994 | Kmiecik-Lawrynowicz et al. | |
| 5,726,262 A | 3/1998 | Kioka et al. | |
| 5,843,612 A | 12/1998 | Lin et al. | |
| 6,194,342 B1 | 2/2001 | Parodi et al. | |
| 6,939,928 B1 | 9/2005 | Kawai et al. | |
| 7,847,040 B2 | 12/2010 | Mori et al. | |
| 2002/0007033 A1 | 1/2002 | Karandinos et al. | |
| 2003/0055179 A1 | 3/2003 | Ota et al. | |
| 2003/0236378 A1 | 12/2003 | Ozdemir et al. | |
| 2006/0276607 A1 | 12/2006 | Ikenaga et al. | |
| 2007/0225431 A1 | 9/2007 | Mori et al. | |
| 2009/0203858 A1 | 8/2009 | Grass et al. | |
| 2011/0305983 A1 | 12/2011 | Kounou et al. | |

FOREIGN PATENT DOCUMENTS

| | | |
|---|---|---|
| CN | 1206853 A | 2/1999 |
| CN | 1426427 A | 6/2003 |
| EP | 0 890 882 A1 | 1/1999 |
| EP | 1 741 747 A1 | 1/2007 |
| JP | 57-63310 | 4/1982 |
| JP | 58-083006 | 5/1983 |
| JP | 62-73276 | 4/1987 |
| JP | 2-41303 | 2/1990 |
| JP | 3-000706 | 1/1991 |
| JP | 3-193796 | 8/1991 |

(Continued)

OTHER PUBLICATIONS

International Search Report issued in related International Patent Application No. PCT/JP2013/058348, completed May 17, 2013.
"Applications of Polypropylene Wax and Advance in Technologies for the Preparation Thereof", Ruihua Yang et al., Hebei Chemical Industry, 1997, Issue 1, pp. 49-51, with Partial English Translation (Translation of Bibliographic description, Section 3 and References of this document).
Extended European Search Report dated Oct. 16, 2015 issued in European Patent Application No. 13768623.4.
Office Action dated Sep. 29, 2015 issued in Chinese Patent Application No. 201380015273.7.

*Primary Examiner* — Robert Harlan
(74) *Attorney, Agent, or Firm* — Foley & Lardner LLP

(57) ABSTRACT

Provided are a propylene-based polymer useful for providing a toner that is excellent in offset resistance, can be fixed by using a low-temperature heating element and hardly has stickiness even after stored for a long period of time; and a toner including said propylene-based polymer. The present invention is directed to a propylene/α-olefin copolymer (A) which includes 60 to 90 mol % of structural units derived from propylene (a) and 10 to 40 mol % of structural units derived from α-olefins having 4 or more carbon atom (b) wherein (a)+(b)=100 mol % and which satisfies: (i) a weight average molecular weight (Mw) as measured by GPC of 3,000 to 40,000; (ii) a melting point (Tm) as measured by DSC of 60 to 90° C.; and (iii) a half width of a crystalline melting point peak as measured by DSC of 1 to 20° C.

13 Claims, No Drawings

(56) References Cited

FOREIGN PATENT DOCUMENTS

| | | |
|---|---|---|
| JP | 3-197516 | 8/1991 |
| JP | 4-218508 | 8/1992 |
| JP | 4-326360 | 11/1992 |
| JP | 5-27476 | 2/1993 |
| JP | 6-250439 | 9/1994 |
| JP | 11-84718 | 3/1999 |
| JP | 11-143114 | 5/1999 |
| JP | 2003-105022 | 4/2003 |
| JP | 3476793 | 9/2003 |
| JP | 2006-316202 | 11/2006 |
| JP | 2009-542874 | 12/2009 |
| JP | 2011-21203 | 2/2011 |
| WO | WO 01/27124 A1 | 4/2001 |
| WO | WO-01/46278 A2 | 6/2001 |
| WO | WO-01/46278 A3 | 6/2001 |
| WO | WO 01/53369 A1 | 7/2001 |
| WO | WO 2004/087775 A1 | 10/2004 |
| WO | WO 2010/098021 A2 | 9/2010 |

* cited by examiner

PROPYLENE/ALPHA-OLEFIN COPOLYMER AND USES THEREOF

TECHNICAL FIELD

The present invention relates to a propylene/α-olefin copolymer that gives an electrophotographic toner and the like excellent in e.g. offset resistance, long-term storage stability and low-temperature fixability, and also relates to a toner including the copolymer.

BACKGROUND ART

An electrophotographic toner, so-called an electrostatic toner (hereinafter, also called "toner"), is used, in an electrostatic electrophotography, in order to develop a latent image formed by electrification and exposure to form a visible image. The electrostatic toner is an electrically-charged fine powder prepared by dispersing a colorant such as carbon black and a pigment in a resin. Electrostatic toners are roughly classified into a dry-type two-component toner, in which the toner is used together with a carrier such as iron powders and glass particles; a wet-type toner, which is a dispersion system prepared by using an organic solvent such as an isoparaffin; and a dry-type one-component toner, in which a magnetic fine powder is dispersed.

An image obtained by being developed on a photoreceptor by using an electrostatic toner is transferred on paper, and an image directly developed on paper on which a photosensitive layer is formed is directly fixed by means of heat or solvent vapor. In particular, fixing using a heating roller, which is a contact-type fixing method, is advantageous in terms of e.g. having high thermal efficiency, ensuring image-fixing even with a relatively low temperature heating source and being suited for high-speed copying.

However, the image-fixing by contacting a heating element such as a heating roller with an electrophotographic toner may involve part of the toner being adhered on the surface of the roller and transferred on a subsequent image part: so-called offset phenomenon. A method that is proposed in order to solve this problem is adding a nonpolar wax such as a low-molecular-weight polyethylene wax or low-molecular-weight polypropylene wax to impart releasability to the toner.

A method that is proposed to improve offset resistance is, for example, using, as a wax, a propylene/1-butene random copolymer wax (Patent Document 1). It is described in this document that said method achieves excellent releasability, low heat fixing temperature and almost no occurrence of offset even in high-speed copying.

However, according to the study by the present inventors, it has been found that the above-described developer still needs improvements in terms of its ability to be fixed when a relatively-low-temperature heating element is used (low-temperature fixability) and absence of problems such as occurrence of stickiness of the toner after stored (toner storage property). Regarding the latter-mentioned property, it has been found that heat-curing of the toner may involve blocking of the wax itself, resulting in decrease of handling property and that in the application of the toner to additives such as a toner releasing agent, final products may undergo blocking.

CITATION LIST

Patent Literature

Patent Document 1: JP-A-H4-326360

SUMMARY OF THE INVENTION

Technical Problem

It is an object of the present invention to provide a propylene-based polymer useful for providing a toner that is excellent in offset resistance, can be fixed by using a low-temperature heating element and hardly has stickiness even after stored for a long period of time.

It is another object of the present invention to provide an additive for a toner useful for providing a toner that is excellent in offset resistance, can be fixed by using a low-temperature heating element and hardly has stickiness even after stored for a long period of time.

It is still another object of the present invention to provide a toner that is excellent in offset resistance, can be fixed by using a low-temperature heating element and hardly has stickiness even after stored for a long period of time.

Technical Solution

The present invention provides a propylene/α-olefin copolymer (A) comprising 60 to 90 mol % of structural units derived from propylene (a) and 10 to 40 mol % of structural units derived from α-olefins having 4 or more carbon atom (b) wherein (a)+(b)=100 mol %, the propylene/α-olefin copolymer (A) satisfying the following requirements (i) to (iii). The present invention also provides an additive for a toner and a toner that comprise the propylene/α-olefin copolymer (A).

(i) A weight average molecular weight (Mw) as measured by GPC is 3,000 to 40,000;

(ii) A melting point (Tm) as measured by DSC is 60 to 90° C.; and (iii) A half width of a melting point peak as measured by DSC is 1 to 20° C.

Advantageous Effects of the Invention

When the propylene/α-olefin copolymer (A) of the present invention is used for a toner, the resultant toner is excellent in offset resistance, can be fixed by using a low-temperature heating element and hardly has stickiness even after stored for a long period of time, and therefore the propylene/α-olefin copolymer (A) is useful for an additive for a toner as well as for a toner.

DESCRIPTION OF EMBODIMENTS

Propylene/α-Olefin Copolymer (A)

The propylene/α-olefin copolymer (A) of the present invention includes structural units derived from propylene (a) in an amount of 60 to 90 mol %, preferably 65 to 88 mol %, more preferably 70 to 85 mol %, still more preferably 75 to 82 mol %, and structural units derived from α-olefins having 4 or more carbon atoms (b) in an amount of 10 to 40 mol %, preferably 12 to 35 mol %, more preferably 15 to 30 mol %, still more preferably 18 to 25 mol %, wherein (a)+(b)=100 mol %, the propylene/α-olefin copolymer (A) satisfying the following requirements (i) to (iii):

(i) A weight average molecular weight (Mw) as measured by GPC is 3,000 to 40,000, preferably 5,000 to 35,000, more preferably 7,000 to 20,000, particularly preferably 8,000 to 16,000;

(ii) A melting point (Tm) as measured by DSC is 60 to 90° C., preferably 65 to 85° C., more preferably 70 to 80° C.; and (iii) A half width of a melting point peak as measured by DSC is 1 to 20° C., preferably 5 to 20° C., more preferably 7 to 20° C., still more preferably 10 to 15° C.

When the propylene/α-olefin copolymer (A) having a weight average molecular weight (Mw) in the above range is used for a toner, the resultant toner is excellent in offset resistance and storage stability. When the weight average molecular weight (Mw) is not more than the upper limit, it is believed that the easiness of mixing with a binder resin for the toner is sufficient, and the composition of the toner is readily uniform, so that the above effects are easily exhibited. For the same reasons, the quality of toners hardly varies. On the other hand, when the weight average molecular weight (Mw) is not less than the lower limit, it is believed that the stickiness of the toner and the elimination of the copolymer from the toner hardly take place, and that the storage stability of the toner itself and the storage stability after printing are sufficient.

When the propylene/α-olefin copolymer (A) having a melting point (Tm) in the above range is used for a toner, the resultant toner tends to be excellent in low-temperature fixability and storage stability. By using the propylene/α-olefin copolymer (A) having a half width of a melting point peak in the above range, the resultant toner tends to be excellent in storage stability.

The fact that the propylene/α-olefin copolymer (A) of the present invention has (iii) a half width of a melting point peak as measured by DSC being in the narrow range of 1 to 20° C. is considered to indicate that the distribution of α-olefin in the copolymer has uniformity.

On the other hand, a copolymer having a larger half width, for example, higher than 20° C., contains parts where α-olefin is densely present and parts where α-olefin is sparsely present. The parts where α-olefin is densely present, in particular, can cause the toner to have stickiness and inferior storage stability.

When the propylene/α-olefin copolymer (A) of the present invention is used for a toner, the resultant toner tends to be excellent in the balance among offset resistance, low-temperature fixability and storage stability.

Specific examples of the α-olefins having 4 or more carbon atoms that constitute the propylene/α-olefin copolymer (A) of the present invention include 1-butene, 1-hexene, 4-methyl.1-pentene, 1-octene and 1-decene. Preferable are α-olefins having 4 to 10 carbon atoms, more preferable are α-olefins having 4 to 8 carbon atoms, and particularly preferable is 1-butene. The propylene/α-olefin copolymer (A) of the present invention may contain, as an olefin other than propylene and the α-olefin having 4 or more carbon atoms, structural units derived from e.g. ethylene in a small amount, for example, in an amount of not more than 10 mol %. On the other hand, it is also a preferable embodiment that the structural units derived from ethylene are not contained from the viewpoints such as storage stability of the toner.

The propylene/α-olefin copolymer (A) of the present invention may contain structural units derived from olefin polymerizable monomers other than the α-olefins, in an amount of not more than 10 mol % with respect to 100 mol % of the total of (a)+(b). Examples of such olefin polymerizable monomers include vinyl acetate; unsaturated carboxylic acids such as acrylic acid and methacrylic acid; unsaturated carboxylic acid esters such as methyl acrylate, ethyl acrylate, isobutyl acrylate, n-butyl acrylate, 2-ethylhexyl acrylate, methyl methacrylate, glycidyl methacrylate and dimethyl maleate; and styrene. However, it is preferred that these olefin polymerizable monomers are not contained in terms of the hardness of the propylene/α-olefin copolymer.

The propylene/α-olefin copolymer (A) of the present invention has (iv) ΔH of a melting peak as measured by DSC of preferably 40 to 100 J/g, more preferably 45 to 80 J/g, still more preferably 45 to 70 J/g, most preferably 45 to 60 J/g.

The propylene/α-olefin copolymer having ΔH in the above range gives a toner excellent in the balance between low-temperature fixability and storage stability.

The propylene/α-olefin copolymer (A) of the present invention, in spite of having a melting point (Tm) as measured by DSC that is relatively low, has high hardness and is balanced with excellence, and therefore in its use, the balance between the low-temperature fixability and the storage stability of the toner is particularly superior. Although the reason for this is not definite, it is believed to be that the propylene/α-olefin copolymer (A) in spite of having a melting point (Tm) as measured by DSC that is relatively low exhibits an unexpectedly large ΔH of a melting peak.

Preferably, the propylene/α-olefin copolymer (A) of the present invention has (v) a penetration of not more than 10 dmm, particularly preferably not more than 3 dmm, in terms of properties such as storage stability of the resultant toner.

The amount of vinylidene, which constitutes the unsaturated terminal of the propylene/α-olefin copolymer (A) of the present invention, is not particularly limited. For example, the number of terminal vinylidene group per 1000 carbon atoms as measured by $^1$H-NMR is preferably 0.5 to 5/1000 carbons, more preferably 1 to 4/1000 carbons, particularly preferably 2 to 3.5/1000 carbons. The propylene/α-olefin copolymer (A) when having undergone pyrolysis step as described later tends to satisfy the above range in particular. For example, when the propylene/α-olefin copolymer (A) has undergone a pyrolysis step, the number of vinylidene group can be increased by increasing the degree of pyrolysis, namely by increasing a pyrolysis ratio (Mw before pyrolysis/Mw after pyrolysis).

The number of vinylidene group in the above range is preferable in terms of the tendency of providing much superior affinity with e.g. fillers and additives.

The propylene/α-olefin copolymer (A) of the present invention has a ratio of a ¼ width to a ¾ width of a melting point peak as measured by DSC that is preferably 2 to 5.5, more preferably 3 to 5, particularly preferably 3.2 to 4.0. When the propylene/α-olefin copolymer has a ratio of a ¼ width to a ¾ width of a melting point peak as measured by DSC that is in the above range, the balance between the storage stability of the toner and the low-temperature fixability of the toner is excellent. Although the reason for this is not definite, it is believed that when the ratio of a ¼ width to a ¾ width of a melting point peak is not less than the above lower limit, the propylene/α-olefin copolymer (A) has a moderate composition distribution and thus has good compatibility with the toner, so that low-temperature fixability of the toner is improved. When the ratio of a ¼ width to a ¾ width of a melting point peak is not more than the above upper limit, it is believed that there are few components causing blocking, so that at the time of its incorporation to the toner, the toner exhibits good storage stability.

The propylene/α-olefin copolymer (A) of the present invention has a crystallinity as measured by X-ray diffraction of preferably 40 to 70%, more preferably 45 to 65%, particularly preferably 50 to 58%. When the propylene/α-olefin copolymer has a crystallinity as measured by X-ray diffraction within the above range, the storage stability and the color development of the toner are excellent. When the propylene/α-olefin copolymer (A) has a crystallinity that is not less than the above lower limit, it is believed that there are few components causing blocking, so that storage stability of the toner is good. When the propylene/α-olefin copolymer (A) has a crystallinity that is not more than the above upper limit, it is believed that the cloudiness caused by crystals attributed to the propylene/α-olefin copolymer (A) is suppressed which is considered to inhibit the color development of the toner, so that color development of the toner is good.

The propylene/α-olefin copolymer (A) of the present invention has a peak intensity ratio as determined by small-angle X-ray diffraction of preferably 0.5 to 10, more preferably 1 to 5, particularly preferably 1.3 to 3. When the propylene/α-olefin copolymer has a peak intensity ratio as determined by small-angle X-ray diffraction in the above range, the low-temperature fixability and the storage stability as well as the color development of the toner are excellent. Although the reason for this is not definite, the peak intensity ratio as determined by small-angle X-ray diffraction of the propylene/α-olefin copolymer is considered to represent the domain size dependent on a copolymer component other than a propylene skeleton, namely α-olefin. When the propylene/α-olefin copolymer has a peak intensity ratio as determined by small-angle X-ray diffraction that is not less than the above lower limit, it is believed that the effect of the α-olefin copolymerization is exhibited and excellent low-temperature fixability of the toner are achieved When the propylene/α-olefin copolymer has a peak intensity ratio as determined by small-angle X-ray diffraction that is not more than the above upper limit, it is believed that there are no extremely large domains attributed to the copolymer component other than the propylene skeleton, namely α-olefin, which can cause blocking or cloudiness, so that the storage stability and the color development of the toner are good.

The propylene/α-olefin copolymer (A) of the present invention has a peak intensity ratio as determined by wide-angle X-ray diffraction of preferably 1.5 to 4, more preferably 2 to 3.1, particularly preferably 2.3 to 3. When the propylene/α-olefin copolymer has a peak intensity ratio as determined by wide-angle X-ray diffraction in the above range, the storage stability of the toner and the color development of the toner are excellent. Although the reason for this is unknown, the peak intensity ratio as determined by wide-angle X-ray diffraction of the propylene/α-olefin copolymer is considered to represent the homogeneity of crystalline components. When the propylene/α-olefin copolymer has a peak intensity ratio as determined by wide-angle X-ray diffraction that is not less than the above lower limit, it is believed that the inhomogeneity of the crystalline components causing blocking is lowered, so that the storage stability of the toner is good. When the propylene/α-olefin copolymer has a peak intensity ratio as determined by wide-angle X-ray diffraction that is not more than the above upper limit, it is believed that the homogeneity of the crystals is moderate and cloudiness attributed to the propylene/α-olefin copolymer is inhibited, so that the color development of the toner is good.

The propylene/α-olefin copolymer (A) of the present invention may have Mw/Mn as measured by GPC of, although not particularly limited to, for example, about 1 to 5, preferably about 2 to 4. When the Mw/Mn is in the above range, the resultant toner is excellent in the balance among low-temperature fixability, storage stability and offset resistance. For example, when the Mw/Mn is 1.1 to 3.0, preferably 2.0 to 3.0, the resultant toner tends to be much superior in low-temperature fixability and storage stability. When the Mw/Mn is more than 3.0, preferably about 3.1 to 5.0, more preferably about 3.1 to 4.0, the resultant toner tends to be particularly superior in offset resistance.

<<Process for Producing Propylene/α-Olefin Copolymer (A)>>

The propylene/α-olefin copolymer (A) of the present invention may be produced by any method which is not particularly limited: for example, the copolymer (A) may be produced by using metallocene catalysts, or may be produced by pyrolyzing a propylene/α-olefin copolymer having a relatively high molecular weight. The propylene/α-olefin copolymer (A) may be purified by a method such as solvent fractionation, which is a fractionation method utilizing the difference in solubility with respect to solvents.

When the propylene/α-olefin copolymer (A) of the present invention is directly produced through polymerization reaction, controlling, e.g. the charged amount of α-olefins, the type of polymerization catalysts, polymerization temperature and the addition amount of hydrogen can lead to controlling e.g. melting point, molecular weight and intrinsic viscosity [η].

The propylene/α-olefin copolymer (A) of the present invention is preferably a copolymer obtained by pyrolyzing a copolymer (A-1) of propylene and an α-olefin having 4 or more carbon atoms.

When the copolymer obtained by pyrolyzing the propylene/α-olefin copolymer (A-1) according to the present invention is used for a toner, the toner is much superior in offset resistance and in the balance between low-temperature fixability and anti-stickiness.

Examples of processes for pyrolyzing the propylene/α-olefin copolymer (A-1) according to the present invention include a method in which under inert atmosphere such as nitrogen, the propylene/α-olefin copolymer (A-1) is fed to an extruder, and then heated, kneaded and extruded to thereby be pyrolyzed; a method in which the propylene/α-olefin copolymer (A-1) is fed to an extruder, and in a tubular reaction vessel connected to the subsequent stage of the extruder, the propylene/α-olefin copolymer (A-1) is continuously pyrolyzed; and a method in which the propylene/α-olefin copolymer (A-1) is fed to a pyrolysis reaction vessel and is pyrolyzed with stirring batchwise. The temperature of the pyrolysis of the propylene/α-olefin copolymer (A-1) is preferably 300 to 450° C., more preferably 350 to 430° C., particularly preferably 370 to 410° C. By lengthening pyrolysis time and/or elevating temperature, molecular weight can be decreased and the amount of vinylidene group can be increased.

<<Propylene/α-Olefin Copolymer (A-1)>>

The propylene/α-olefin copolymer (A-1) according to the present invention includes structural units derived from propylene (a') in an amount of 60 to 90 mol %, preferably 65 to 88 mol %, more preferably 70 to 85 mol %, still more preferably 75 to 82 mol %, and structural units derived from α-olefins having 4 or more carbon atom (b') in an amount of 10 to 40 mol %, preferably 12 to 35 mol %, more preferably 15 to 30 mol %, still more preferably 18 to 25 mol %, wherein (a')+(b')=100 mol %.

Specific examples of the α-olefins having 4 or more carbon atoms that constitute the propylene/α-olefin copolymer (A-1) according to the present invention include 1-butene, 1-hexene, 4-methyl.1-pentene, 1-octene and 1-decene. Preferable are α-olefins having 4 to 10 carbon atoms, more preferable are α-olefins having 4 to 8 carbon atoms, and particularly preferable is 1-butene. The propylene/α- olefin copolymer (A-1) of the present invention may contain, as an olefin other than propylene and the α-olefins having 4 or more carbon atoms, structural units derived from e.g. ethylene in a small amount, e.g. not more than 10 mol %. On the other hand, a copolymer not containing structural units derived from ethylene is also a preferable embodiment.

The propylene/α-olefin copolymer (A-1) according to the present invention has a melting point Tm as measured by DSC of usually 60 to 120° C., preferably 65 to 100° C., more preferably 70 to 90° C.

The propylene/α-olefin copolymer (A-1) according to the present invention has a half width of a melting point peak as measured by DSC that is usually 1 to 20° C., preferably 2 to 18° C., more preferably 3 to 15° C., still more preferably 4 to 12° C.

The propylene/α-olefin copolymer (A-1) according to the present invention has ΔH of a melting peak as measured by DSC of preferably 30 to 100 J/g, more preferably 35 to 75 J/g, still more preferably 35 to 65 J/g, particularly preferably 40 to 55 J/g.

The propylene/α-olefin copolymer (A-1) according to the present invention has a density of 850 to 910 (kg/m$^3$) as measured by a density gradient tube method in accordance with JIS K 7112.

The propylene/α-olefin copolymer (A-1) according to the present invention has a molecular weight Mw as measured by GPC of 50,000 to 1,000,000, preferably 70,000 to 800,000, more preferably 100,000 to 600,000.

The propylene/α-olefin copolymer (A-1) according to the present invention has a molecular weight distribution (Mw/Mn) as measured by gel permeation chromatography GPC of usually not more than 3, preferably 1.8 to 3.0, more preferably 1.9 to 2.5.

A propylene/α-olefin copolymer obtained by pyrolyzing a propylene/α-olefin copolymer not fulfilling the requirements of the propylene/α-olefin copolymer (A-1) according to the present invention tends to have a broader half width of a melting point peak as measured by DSC, the half width possibly exceeding 20° C., and tends to have a smaller ΔH of a melting peak as measured by DSC, ΔH of a melting peak possibly being less than e.g., 40 J/g.

On the other hand, a copolymer obtained by pyrolyzing the propylene/α-olefin copolymer (A-1) according to the present invention has a half width as measured by DSC that is not broad, e.g. in the range of from 1 to 20° C., and tends to have a ΔH of a melting peak as measured by DSC that is larger, e.g. in the range of 40 to 100 J/g.

It is believed that, since, for example, respective molecules in a copolymer having a half width in a small-value range have little difference in their α-olefin content, respective molecules in a polymer obtained by pyrolyzing such a copolymer have little difference in their α-olefin content. It is presumably for this reason that a copolymer obtained by pyrolyzing such a copolymer does not have lowered crytallinity. Rather, in some cases, the copolymer by being pyrolyzed has increased crytallinity, as evidenced by its increased ΔH. The fact that the copolymer having such a low melting point has higher crytallinity is considered to be an unexpected result.

On the other hand, it is believed that, since, for example, respective molecules in a copolymer having a larger half width, for example, higher than 20° C., have a lot of difference in their α-olefin content, molecules having high α-olefin content are easily pyrolyzed and a copolymer obtained by pyrolyzing such a copolymer has components with an extremely low molecular weight that have relatively higher content of α-olefin. Such components are believed to act to decrease the crystallinity of the resultant polymer.

<<Process for Producing Propylene/α-Olefin Copolymer (A-1)>>

The propylene/α-olefin copolymer (A-1) according to the present invention can be produced by using various known methods, such as high-pressure method, methods using Ziegler catalysts or metallocene catalysts. Among these, the methods using metallocene-based catalysts are preferable. Specific examples of hitherto known catalysts that are suitably used are magnesium-supported titanium catalysts described in documents such as JP-A-S57-63310, JP-A-S58-83006, JP-A-H3-706, JP-B-3476793, JP-A-H4-218508 and JP-A-2003-105022, and metallocene catalysts described in documents such as WO 01/53369, WO 01/27124, WO 2004/087775, JP-A-H3-193796 and JP-A-H02-41303.

The propylene/α-olefin copolymer (A) of the present invention or the propylene/α-olefin copolymer (A-1) according to the present invention may contain additives such as other thermoplastic resins, weathering stabilizers, heat stabilizers, antistatic agents, anti-slip agents, anti-blocking agents, anti-fogging agents, nucleating agents, lubricants, pigments, fillers, dyes, plasticizers, anti-aging agents, hydrochloric acid absorbents, antioxidants and copper inhibitors, as needed, as far as the objects of the present invention are not undermined.

<Toner>

The toner of the present invention comprises the propylene/α-olefin copolymer (A).

The toner of the present invention includes, in addition to the propylene/α-olefin copolymer (A), a binder resin for toners and a known colorant, and further optionally includes an electrification control agent, a releasing agent, a pigment-dispersing agent and the like.

As the binder resin for toners according to the present invention, various known binder resins may be used. Specific examples thereof are amorphous resins including styrene-based polymers, ketone resins, maleic acid resins, polyester resins such as aliphatic polyester resins, aromatic polyester resins and aliphatic-aromatic polyester resins, coumarone resins, phenol resins, epoxy resins, terpene resins, polyvinyl butyral, polybutyl methacrylate, polyvinyl chloride, polyethylene, polypropylene, polybutadiene and ethylene/vinyl acetate copolymer.

These binder resins for toners may be used singly or in combination of two or more thereof. Among the binder resins for toners, in terms of having an appropriate softening point of approximately 100° C. and exhibiting good fixability, polyester resins or styrene-based polymers are preferable, and styrene-based polymers are particularly preferable.

Examples of the styrene-based polymer include homopolymers or copolymers composed of styrene-based monomer alone, and copolymers of styrene-based monomers and other vinyl-based monomers. Examples of the styrene-based monomers include styrene, p-chlorostyrene and vinylnaphthalene.

Examples of the other vinyl-based monomers without being limited thereto include:

ethylenic unsaturated monoolefins such as ethylene, propylene, 1-butene and isobutene;

halogenated vinyls such as vinyl chloride, vinyl bromide and vinyl fluoride;

vinyl esters such as vinyl acetate, vinyl propionate, vinyl benzoate and vinyl lactate;

α-methylene aliphatic monocarboxylic acids such as acrylic acid and methacrylic acid;

esters of α-methylene aliphatic monocarboxylic acids such as methyl acrylate, ethyl acrylate, n-butyl acrylate, isobutyl acrylate, n-octyl acrylate, dodecyl acrylate, 2-chloroethyl acrylate, phenyl acrylate, methyl α-chloroacrylate, methyl methacrylate, ethyl methacrylate and butyl methacrylate;

nitriles or amides such as acrylonitrile, methacrylonitrile and acrylamide;

vinyl ethers such as vinyl methyl ether, vinyl ethyl ether, vinyl propyl ether and vinyl isobutyl ether;

vinyl ketones such as vinyl methyl ketone, vinyl hexyl ketone, methyl isopropenyl ketone;

N-vinyl compounds such as N-vinylpyrrole, N-vinylcarbazole, N-vinylindole and N-vinylpyrrolidone;

itaconic acid esters such as dimethyl itaconate, dipropyl itaconate, dibutyl itaconate, dioctyl itaconate and diamyl itaconate; and others such as maleic acid esters and fumaric acid esters.

Of these vinyl monomers, esters of α-methylene aliphatic monocarboxylic acids are preferable.

The styrene-based polymer can be synthesized by a know polymerization method such as bulk polymerization method, solution polymerization method, suspension polymerization method and emulsification polymerization method.

In the toner of the present invention, with respect to 100 parts by mass of the binder resin for toners, the propylene/α-olefin copolymer (A) is contained in an amount of, for example, 0.1 to 40 parts by mass. The lower limit of the content of the propylene/α-olefin copolymer (A) is preferably 0.5 part by mass, more preferably 1.0 part by mass, still more preferably 1.5 parts by mass, particularly preferably 2.0 parts by mass. A preferable upper limit of the content of the propylene/α-olefin copolymer (A) is 35 parts by mass, more preferably 20 parts by mass, still more preferably 10 parts by mass, particularly preferably 6 parts by mass. The content of the propylene/α-olefin copolymer (A) that is not less than the above lower limit is preferable in terms of achieving sufficient offset resistance and storage stability of the toner. On the other hand, the content of the propylene/α-olefin copolymer (A) that is not more than the upper limit is preferable in terms of achieving sufficient fixability and particularly fixing stability over time after printing.

Examples of the colorant include black pigments such as carbon black, acetylene black, lamp black and magnetite; chrome yellow, yellow iron oxide, known pigments such as Hansa yellow G, quinoline yellow lake, permanent yellow NCG, molybdenum orange, vulcan orange, indanthrene, brilliant orange GK, red iron oxide, brilliant carmine 6B, Frizaline lake, methyl violet lake, fast violet B, cobalt blue, alkali blue lake, phthalocyanine blue, fast sky blue, pigment green B, malachite green lake, titanium oxide and zinc oxide. The content of the colorant is usually 5 to 250 parts by mass with respect to 100 parts by mass of the binder resin for toners.

As needed, as far as the effects of the present invention are not undermined, any of the hitherto known releasing agents may be added: for example, polyvinyl chloride, polyvinyl acetate, polyolefins, polyesters, polyvinyl butyral, polyurethanes, polyamides, rosins, modified rosins, terpene resins, phenol resins, aliphatic hydrocarbon resins, aromatic petroleum resins, paraffin waxes, polyolefin waxes excluding the propylene/α-olefin copolymer (A) of the present invention, natural waxes such as ceramic wax, rice wax, sugar wax, urushi wax, beeswax, carnauba wax, candelilla wax and montan wax, fatty acid amide waxes, vinyl chloride resin, styrene-butadiene resin, coumarone-indene resin and melamine resin.

As the electrification control agent, known charge regulators such as nigrosine, quarternary ammonium salts and metal-containing azo dyes may be appropriately selected and used. The use amount is usually 0.1 to 10 parts by mass with respect to 100 parts by mass of the binder resin for toners.

The toner of the present invention can be produced by dispersing respective components described above by any known methods such as contact-dispersing, melt-dispersing and solution-dispersing.

For example, a binder resin for toners, the propylene/α-olefin copolymer (A), a colorant, a charge regulator, a releasing agent and the like are premixed with one another. The mixture is kneaded while being heated and molten by using a biaxial kneading machine, and then cooled. The resultant mixture is pulverized by using a pulverizing machine and classified by using an air-type classifying device to collect particles of usually 8 to 20 μm. Thereby, a toner is produced.

The toner of the present invention may be produced also by a process including a mixing step of mixing a resin-particle dispersion liquid prepared by dispersing resin particles in a dispersing agent, a colorant dispersion liquid prepared by dispersing colorant particles in a dispersing agent, a releasing-agent-particle dispersion liquid prepared by dispersing particles of the propylene/α-olefin copolymer (A) in a dispersing agent and the like with one another; an agglomeration step of forming agglomerated particles with particle diameter corresponding to the particle diameter of the toner; and a fusion step of fusing the agglomerated particles by heating.

The toner of the present invention may be produced also by a process including a step of polymerizing a composition containing a polymerizable monomer, a colorant, the propylene/α-olefin copolymer (A), a charge regulator and the like. At this time, exemplary methods include a suspension polymerization method described in JP-A-S62-73276 and JP-A-H5-27476 to give a toner; an emulsification polymerization method described in JP-A-H6-250439 to give a toner; and an agglomeration method in which primary polar polymerized particles previously prepared are agglomerated with e.g. polar particles having an opposite charge to give a toner.

Conditions for the heat-melting by using the above biaxial kneading machine vary depending on properties such as melting point of the binder resin for toners. For example, when a polar group-containing vinyl polymer such as a styrene acrylic resin is used, it is preferred that the resin temperature at the discharge part of the biaxial kneading machine is lower than 190° C. and the residence time is less than 180 seconds. A preferred cooling method is rapid cooling using e.g. a steel belt cooler.

The kneading is for example conducted as follows. Under conditions allowing the content of the propylene/α-olefin copolymer (A) to be high, the propylene/α-olefin copolymer (A) is kneaded with a binder resin for toners to prepare a masterbatch, and this masterbatch is kneaded further with a binder resin for toners and other components such as a colorant. This method is effective when a binder resin for toners and the propylene/α-olefin copolymer (A) are combined which are relatively difficult to mix with the other.

When the masterbatch is prepared, with respect to 100 parts by mass of the binder resin for toners, the content of the propylene/α-olefin copolymer (A) is 5 to 900 parts by mass, preferably 5 to 300 parts by mass, more preferably 5 to 100 parts by mass, particularly preferably 5 to 50 parts by mass.

The toner of the present invention, whose applications are not particularly limited, can be used as a two-component developer formed from a mixture of a non-magnetic toner and a magnetic carrier; a one-component developer formed from a magnetic toner; or a 1.5-component developer in which a magnetic carrier and a magnetic toner are mixed with each other. That is, the toner of the present invention may be mixed with a carrier and used as a two-component or 1.5-component developer; may be used as a magnetic one-component developer which contains a magnetic powder contained in the toner and uses no carriers; may be used as a one-component developer which uses neither carriers nor magnetic powders: or may be used as a micro-toning developer. When the toner of the present invention is used as the two-component or the 1.5-component developer, the carrier may be a hitherto known carrier. Examples of the carrier that may be used include magnetic powders such as iron powder, ferrite powder and nickel powder, glass beads and these powders surface-treated with resins. Examples of the resin used for coating the carrier surfaces include styrene-acrylic acid ester copolymers, styrene-methacrylic acid ester copolymers, acrylic acid ester copolymers, methacrylic acid ester copolymers, fluorine-containing resins, silicon-containing resins, polyamide resins, ionomer resins, polyphenylenesulfide resins and mixtures formed by any of these.

The toner of the present invention, because of containing the propylene/α-olefin copolymer (A), is excellent in offset resistance and in the balance between toner fixability and toner storage property. Furthermore, the toner of the present invention, even if partially pyrolyzed at the time of its storage and its use under high temperature, hardly has inferior stickiness property.

The propylene/α-olefin copolymer (A) of the present invention, in addition to being used for additives for a toner, can be used for various applications including coating additives, modifiers for primers, surface-coating agents for packaging materials, nonwoven fabric modifiers, lubricants for sintering materials, releasing agents for artificial leathers, lustering agents, fluidity-improving agents for thermoplastic resins or thermosetting resins typified by polyolefins and engineering plastics, resin-surface property modifiers, resin-strength modifiers, resin compatibilizers, resin lubricants, resin hardness/melting point regulating agents, releasing agents for resin molding, rubber-processing assistants, antioxidants for rubbers, paper-quality improving agents, various additives typified by antiwear agents and leveling agents for printing ink, additives for heat transferring ink, fiber-processing assistants, additives for hot melt adhesives, electric insulting agents, components of natural waxes, antifogging agents for polyolefin films, pigment-dispersing agents (dispersing agents for pigment masterbatches), processing assistants for molding, paper coatings, thermosensors, binders for heat sensitive paper, overcoating agents for heat sensitive paper, emulsion components, additives for floor polishing, fiber-finishing agents, lubricants for vinyl chloride, additives for asphalts, nucleating agents for foamed polystyrenes, additives for lost-wax casting, one component of candles, additives for electric cable compounds, and intermediate materials in various reactions typified by air oxidation, acid modification, silicone modification, amination and esterification.

EXAMPLES

Next, with reference to Examples, the present invention will be more specifically described, but the present invention is not limited by these Examples unless deviating from its gist.

Properties and the like in Examples and Comparative Examples were measured by the following methods.

[Composition of Propylene/α-Olefin Copolymer]

The structural units derived from propylene and the structural units derived from α-olefins having 4 or more carbon atoms of the propylene/α-olefin copolymer were determined by the analysis of $^{13}$C-NMR spectrum.

[Molecular Weight/Molecular Weight Distribution]

The weight average molecular weight (Mw) of the propylene/α-olefin copolymer was determined by GPC measurement. GPC measurement was conducted under the following conditions. The weight average molecular weight (Mw) and the number average molecular weight (Mn) were determined by preparing a calibration curve with the use of a commercially-available monodispersion polystyrene and on the basis of a conversion method described below.

Apparatus: gel permeation chromatograph, Alliance GPC2000 (manufactured by Waters)
Solvent: o-dichlorobenzene
Column: Four pieces of TSKgel column (manufactured by TOSOH Corporation)
Flow rate: 1.0 ml/min
Sample: 0.15 mg/mL o-dichlorobenzene solution
Temperature: 140° C.
Molecular weight conversion: PP conversion/general calibration method Regarding the calculation for the general calibration, coefficients of Mark-Houwink viscosity formula were used. For Mark-Houwink coefficients of PS and PP, values described in a literature (J. Polym. Sci., Part A-2,8,1803 (1970), Makromol. Chem., 177,213 (1976)) were used.

[Melting Point (Tm)]

The melting point (Tm) of the propylene/α-olefin copolymer was measured in accordance with DSC (differential scanning calorimetry) by using DSC-20 (manufactured by Seiko Instruments & Electronics Ltd.). A sample in amount of about 10 mg was heated from −20° C. to 200° C. at 10° C./min, and an endothermic peak of a curve obtained was defined as a melting point. Before this heating measurement, the sample (copolymer) had been heated to about 200° C., kept for 5 minutes, and cooled at 10° C./min to −20° C., to thereby make the thermal history of the sample (copolymer) uniform.

[Half Width of Melting Point Peak]

In the whole endothermic peak obtained by DSC, a peak width) (C.°) at half of the height from a base line to an endothermic peak top was defined as a half width.

[DSC Shape]

In a melting point peak as measured by DSC, the ratio of a ¼ width to a ¾ width was defined as DSC shape. DSC shape was determined as follows. Regarding the height from a base line to an endothermic peak top in the whole endothermic peak obtained by DSC, the ratio of a peak width A (° C.) at a ¼ position of the height from the base line to a peak width B (° C.) at a ¾ position of the height from the base line, i.e. (A/B), was defined as DSC shape.

[Amount of Heat of Fusion (ΔH)]

An area delimited by an endothermic peak and a base line of the whole endothermic peak obtained by DSC described above was determined, from which an amount of heat of fusion (ΔH) (J/g) was calculated.

[Amount of Terminal Vinylidene]

The amount of terminal vinylidene of the propylene/α-olefin copolymer was measured from $^1$H-NMR. $^1$H-NMR was measured by using JNM-ECX400P, a nuclear magnetic resonance apparatus manufactured by JOEL, Ltd. by the following manners. 20 mg of a sample was completely dissolved in about 0.5 ml of deuterated o-dichlorobenzene in an NMR sample tube (5 mm in diameter), and the solution was subjected to measurement at 120° C. A peak integrated intensity (C) of two protons attributed to a vinylidene group observed at approximately 4.7 ppm was determined provided that the whole integrated intensity of a signal attributed to the propylene-based polymer was normalized to 2000. By employing the peak integrated intensity (C), the amount of terminal vinylidene was determined based on the following equation.

Amount of terminal vinylidene $L$ (number/1000 carbons)=$C/2$

[Crystallinity]

A measurement sample was heated by using a hot press at 180° C. for 5 minutes, and water-cooled by using a cold press for 5 minutes, to prepare a 1 mm-thick press sheet. A wide-angle X-ray diffraction profile of the resultant press sheet was measured by using an X-ray diffraction apparatus with a rotating sample table (RINT2500 manufactured by Rigaku Corporation) using CuKα ray under conditions of 50 kV-300 mA with 2θ being in the range of from 5 to 35° by transmission method.

The resultant X-ray diffraction profile was employed to separate crystalline parts from amorphous parts. From a ratio between diffraction intensities of respective parts, crystallinity was determined.

[Peak Intensity Ratio of Small-Angle X-Ray Scattering Profile]

The small-angle X-ray scattering profile of the press sheet prepared for crystallinity evaluation was measured by using an X-ray diffraction apparatus (RINT2500 manufactured by Rigaku Corporation) using CuKα ray under conditions of 50 kV-300 mA with 2θ being in the range from −2 to +2° by transmission method.

The peak intensity ratio of the small-angle X-ray scattering was determined by the following method. On the basis of a base line of the whole scattering profile, a scattering intensity observed when 2θ was 0.25° and a scattering intensity observed when 2θ was 0.75° were determined, and a ratio between these scattering intensities was calculated.

[Peak Intensity Ratio of Wide-Angle X-Ray Diffraction Profile]

The wide-angle X-ray diffraction profile of the press sheet prepared for crystallinity evaluation was measured by using a wide-angle X-ray diffraction apparatus with a rotating sample table (RINT2500 manufactured by Rigaku Corporation) under conditions of 40 kV-370 mA with 2θ being in the range of from 5 to 35° by reflection method.

The peak intensity ratio of the wide-angle X-ray diffraction was determined by the following method. On the basis of a base line of the whole diffraction profile, a peak intensity attributed to polypropylene (110) surface, and the lowest intensity observed at a valley between the peak attributed to polypropylene (110) surface and a peak attributed to polypropylene (040) surface, were determined. A ratio between the diffraction intensities was calculated.

The peak of the polypropylene (110) surface is observed when 2θ is usually in the range of from 11 to 15°, and is a conspicuous peak observed first when counted from the lower angle of measurement. The peak of the polypropylene (040) surface is observed when 2θ is usually in the range of from 15 to 18°, and is a conspicuous peak observed second when counted from the lower angle of measurement.

[Penetration]

A propylene/α-olefin copolymer sample molten so as to avoid local heating and prevent bubbles from being mixed thereto in accordance with JIS K 2207 was allowed to stand at room temperature of 15 to 30° C. for 1 to 1.5 hours to be solidified, and kept in a thermostatic chamber at 25° C. Upon the stability of temperature, a predetermined needle was allowed to penetrate the sample surface for 5 seconds. A penetrating length of the needle at this time was defined as a penetration (dmm).

The toner evaluation methods conducted in the present invention are described below.

1. Low-Temperature Fixability

By using a copying machine which was a modification of a commercially-available electrophotographic copying machine, an unfixed image was prepared. Thereafter, this unfixed image was fixed by using a heat-roller fixing apparatus which was a modification of a fixing part of a commercially-available copying machine, at a temperature of 130° C., with the fixing speed of the heat roller being 190 mm/sec. The resultant fixed image was rubbed 6 times by using an ink eraser (manufactured by Tombow Pencil Co., Ltd.) with a load of 1.0 kgf applied thereto. The image densities before and after the rubbing test were measured by using a Macbeth reflection densitometer. Image density after rubbing/Image density before rubbing×100 was defined as percentage of change at that temperature. An average value of the percentage of change at 130° C. was calculated as fixability. The fixability was evaluated under the following criteria. The heat-roller fixing apparatus used here did not have a silicone-oil-feeding mechanism. Environment conditions adopted here were room temperature and atmospheric pressure (temperature: 22° C., relative humidity: 55%).

(Evaluation Criteria)
 AA: 42%≤fixability
 BB: 39%≤fixability<42%
 CC: 35%≤fixability<39%
 DD: fixability<35%

2. Offset Resistance

The measurement was conducted similarly to the measurement of the above minimum fixing temperature. Specifically, by using the above-described copying machine, an unfixed image was prepared. Then, the toner image was transferred and subjected to fixing treatment using the above-described heat-roller fixing apparatus. Thereafter, whether a non-image part was stained with the toner was observed. With the temperature of the heat roller of the heat-roller fixing apparatus sequentially increased from 190° C., the fixing operation was repeated. A minimum temperature at which stain with the toner was caused was defined as an offset occurrence temperature. The copying machine was under the atmosphere of a temperature of 22° C. and a relative humidity of 55%.

(Evaluation Criteria)
 AA: 220° C.≤Offset occurrence temperature
 BB: 210° C.≤Offset occurrence temperature<220° C.
 CC: 200° C.≤Offset occurrence temperature<210° C.
 DD: Offset occurrence temperature<200° C.

3. Storage Property 5 g of a toner that had been allowed to stand in the environment of at a temperature of 50° C. and at a relative humidity of 60% for 24 hours was placed on a 150-mesh sieve. With the scale of a regulating resister set at 3 in a powder tester (Hosokawa Powder Technology Research Institute), the toner was shaken for 1 minute. After shaking, a mass of the toner remaining on the 150-mesh sieve was measured, and a mass percent of residue was determined.

(Evaluation Criteria)
AA: Mass percent of residue<45%
BB: 45%≤Mass percent of residue<60%
CC: 60%≤Mass percent of residue<75%
DD: 75%≤Mass percent of residue Production Example of Low Molecular Weight Vinyl Resin (L-1)

Production Example L-1

100 parts by mass of a mixed xylene was introduced to a nitrogen-purged flask and was heated. Under the refluxing of the mixed xylene, a mixture liquid prepared by adding and dissolving 10 parts by mass of t-butylperoxy-2-ethylhexanoate in 93 parts by mass of styrene, 6 parts by mass of n-butyl acrylate and 1 part by mass of methacrylic acid was continuously added over 5 hours, and further refluxing was continued for 1 hour. Thereafter, with the temperature inside the flask kept at 98° C., 0.5 part by mass of t-butylperoxy-2-ethylhexanoate was further added, and reaction was continued for 1 hour. 0.5 part by mass of t-butylperoxy-2-ethylhexanoate was further added, and reaction was continued for 2 hours. A polymerization liquid of a low molecular weight vinyl resin L-1 having a peak molecular weight of 4600 and an acid value of 6.5 mgKOH/g was thus obtained.

<Acid Value>

An acid value in Examples of the present invention was calculated in the following manner. In a mixture solvent of a mixed xylene: n-butanol=1:1 mass ratio, a precisely-weighed sample was dissolved. The solution was titrated by using an alcohol of N/10 potassium hydroxide previously standardized (product obtained by adding 5 g of ion exchange water to 7 g of a special-grade potassium hydroxide, with its amount being allowed to be 1 L (litter) with a first-grade ethyl alcohol and its titer=F standardized against N/10 hydrochloric acid and a 1% phenolphthalein solution), to determine its neutralization amount. This was used to calculate an acid value, based on the following equation.

Acid value (mgKOH/g)=($N$/10 KOH titration amount (ml)×$F$×5.61)/(sample (g)×0.01)

<Peak Molecular Weight>

A peak molecular weight defined in Examples of the present invention is determined by GPC measurement, and is a converted molecular weight obtained by preparing a calibration curve using monodispersion standard polystyrene. Peaks defined in Examples of the present invention include shoulder peaks. The measurement conditions are as described below. Immediately before the measurement, from a sample solution, components insoluble in THF were removed by using a filter.

GPC apparatus: SHODEX GPC SYSTEM-21 (Showa Denko K.K.)
Detector: SHODEX RI SE-31 (Showa Denko K.K.)
Column: SHODEX GPC KF-807L (three columns) and GPC KF-800D (one column) (Showa Denko K.K.)
Solvent: THF
Flow rate: 1.2 ml/min.
Sample concentration: 0.002 g-resin/ml-THF
Poured amount: 100 μL In the measurement of the molecular weight of the toner, 10% by mass of the toner was sufficiently dissolved in 90% by mass of THF, and to the solution, 50 parts by mass of SIMGON talc and 50 parts by mass of titanium (CR-95) were added, followed by centrifugation. The resultant supernatant liquid was adjusted to have a predetermined density, and subjected to measurement.

Production Example of High Molecular Weight Vinyl Resin (H-1)

Production Example H-1

74 parts by mass of styrene, 23.5 parts by mass of n-butyl acrylate and 2.5 parts by mass of methacrylic acid were introduced into a nitrogen-purged flask. The temperature inside the flask was increased to 120° C. With the temperature kept at this temperature, bulk polymerization was carried out for 8 hours. Subsequently, 50 parts by mass of a mixed xylene was added, and 0.2 part by mass of tetraethylene glycol diacrylate was added, and the temperature was increased to 110° C. 0.35 part by mass of 1,1-bis(t-butylperoxy)cyclohexane and 60 parts by mass of a mixed xylene, which had been previously mixed and dissolved with each other, were added continuously over a period of 9 hours with the temperature kept at 110° C., and then reaction was continued for 1 hour. Then, 0.21 part by mass of 1,1-bis(t-butylperoxy)cyclohexane was added, and reaction was continued for 2 hours. Further, 0.52 part by mass of 1,1-bis(t-butylperoxy)cyclohexane was added, and reaction was continued for 2 hours before polymerization was completed. A polymerization liquid of a high molecular weight vinyl resin H-1 having a peak molecular weight of 300000 and an acid value of 16.3 mgKOH/g was thus obtained.

Production Example of Binder Resin (C-1)

Production Example C-1

Each of the polymerization liquids was mixed with the other so that the mixture contained 50 parts by mass of the high molecular weight vinyl resin (H-1) and 50 parts by mass of the low molecular weight vinyl resin (L-1). The resultant mixture was flushed to a vessel (container) at 190° C. at 1.33 kPa, and a solvent and the like were distilled off. A binder resin C-1 having a first peak molecular weight of 4600, a second peak molecular weight of 300000 and an acid value of 11.4 mgKOH/g was thus obtained.

Production Example of Propylene/α-Olefin Copolymer

Production Example 1

Polymerization for Metallocene-Based Propylene/1-Butene Copolymer

To a 2000 ml polymerization apparatus sufficiently purged with nitrogen, 900 ml of dry hexane, 65 g of 1-butene and triisobutylaluminum (1.0 mmol) were introduced at room temperature, and the temperature inside the polymerization apparatus was increased to 70° C. This was followed by pressurization using propylene to 0.7 MPa. Subsequently, a toluene solution of 0.002 mmol of dimethylmethylene(3-tert-butyl-5-methylcylopentadienyl)fluorenylzirconiumdichloride that had been contacted with 0.6 mmol in terms of aluminum of methylaluminoxane (manufactured by Tosoh Finechem Corporation) was added to the polymerization apparatus. With the temperature inside the polymerization apparatus kept at 62° C. and propylene pressure kept at 0.7 MPa, polymerization was conducted for 30 minutes. By adding 20 ml of methanol, polymerization was terminated.

After depressurization, in 2 L of methanol, a polymer was allowed to be precipitated from a polymerization solution. The precipitated polymer was dried under vacuum at 130° C. for 12 hours. A propylene/1-butene copolymer was thus obtained. Properties of the resultant propylene/1-butene copolymer are shown in Table 1.

Production Example 2

Polymerization of Ziegler-Based Propylene/1-Butene Copolymer

To a 2 L autoclave sufficiently purged with nitrogen, 830 ml of hexane and 100 g of 1-butene were introduced, and 1 mmol of triisobutylaluminum was added. They were heated to 70° C., and then propylene was fed to allow the total pressure to be 0.7 MPa. Then, 1 mmol of triethylaluminum and 0.005 mmol in terms of Ti atom of a titanium catalyst supported by magnesium chloride were added. Propylene was continuously fed, with the total pressure kept at 0.7 MPa. Polymerization was conducted for 30 minutes. This was followed by the same post-polymerization treatments as in Production Example 1. A Ziegler-based propylene/1-butene copolymer was thus obtained. Properties of the resultant propylene/1-butene copolymer are shown in Table 1.

TABLE 1

| Copolymer | | Production Example 1 | Production Example 2 |
|---|---|---|---|
| Propylene content | mol % | 79 | 75 |
| 1-butene content | mol % | 21 | 25 |
| Melting point (Tm) | ° C. | 86 | 110 |
| Half width | ° C. | 6 | 25 |
| ΔH | J/g | 45 | 60 |
| Mw/Mn | | 2.2 | 4.4 |
| Mw | | 230,000 | 320,000 |

Production of Propylene/1-Butene Copolymer by Pyrolysis

Example 1

To a 1.5 L stainless pyrolysis apparatus equipped with a stirring device, a nitrogen-introducing tube and a condenser, 200 g of the metallocene-based propylene/1-butene copolymer obtained in Production Example 1 was introduced. The system was sufficiently purged with nitrogen. Then, with the flowing of nitrogen, the pyrolysis apparatus was heated to 380° C. to melt the resin, followed by stirring. After the resin temperature inside the system reached a predetermined temperature, heating was carried out for 2.5 hours for pyrolysis. Thereafter, the pyrolysis apparatus was cooled to room temperature. A propylene/1-butene copolymer indicated in Table 2 was thus obtained.

Example 2

A propylene/1-butene copolymer was obtained in the same manner as in Example 1, except that, in Example 1, the heating time for pyrolysis of the metallocene-based propylene/1-butene copolymer obtained in Production Example 1 was 4.5 hours. Properties of the resultant propylene/1-butene copolymer are indicated in Table 2.

Example 3

A propylene/1-butene copolymer was obtained in the same manner as in Example 1, except that, in Example 1, the heating time for pyrolysis of the metallocene-based propylene/1-butene copolymer obtained in Production Example 1 was 6 hours. Properties of the resultant propylene/1-butene copolymer are shown in Table 2.

Comparative Example 1

In accordance with the production method described in Example 11 of JP-A-H3-197516, a propylene/ethylene copolymer indicated in Table 2 was obtained.

Comparative Example 2

To a 1.5 L stainless pyrolysis apparatus equipped with a stirring device, a nitrogen-introducing tube and a condenser, 200 g of the Ziegler-based propylene/1-butene copolymer obtained in Production Example 2 was introduced, and the system was sufficiently purged with nitrogen. Subsequently, under the flowing of nitrogen, the pyrolysis apparatus was heated to 380° C. to melt the resin, followed by stirring. After the resin temperature inside the system reached a predetermined temperature, heating was conducted for 4.5 hours for pyrolysis. Thereafter, the pyrolysis apparatus was cooled to room temperature. A propylene/1-butene copolymer indicated in Table 2 was thus obtained.

Comparative Example 3

A propylene/1-butene copolymer was obtained in the same manner as in Comparative Example 2, except that, in Comparative Example 2, the heating time for pyrolysis of the Ziegler-based propylene/1-butene copolymer obtained in Production Example 2 was hours. Properties of the resultant propylene/1-butene copolymer are shown in Table 2.

TABLE 2

| Copolymer | | Example 1 | Example 2 | Example 3 | Comparative Example 1 | Comparative Example 2 | Comparative Example 3 |
|---|---|---|---|---|---|---|---|
| Production method | | Pyrolysis | Pyrolysis | Pyrolysis | Direct Polymerization | Pyrolysis | Pyrolysis |
| Propylene content | mol % | 79 | 79 | 80 | 81 | 76 | 77 |
| 1-butene content | mol % | 21 | 21 | 20 | — | 24 | 23 |
| Ethylene content | mol % | — | — | — | 19 | — | — |
| Mw | | 15,000 | 9,300 | 7,100 | 42,000 | 6,900 | 4,700 |
| Melting point (Tm) | ° C. | 81 | 78 | 74 | 79 | 95 | 90 |

TABLE 2-continued

| Copolymer | | Example 1 | Example 2 | Example 3 | Comparative Example 1 | Comparative Example 2 | Comparative Example 3 |
|---|---|---|---|---|---|---|---|
| DSC half width | °C. | 14 | 13 | 16 | 18 | 30 | 29 |
| DSC shape | — | 3.4 | 3.6 | 3.6 | 4.5 | 6.1 | 6.1 |
| ΔH | J/g | 50 | 50 | 49 | 27 | 59 | 59 |
| Crystallinity | % | 53 | 54 | 56 | 33 | 61 | 63 |
| Small-angle X-ray diffraction peak intensity ratio | — | 1.6 | 1.6 | 1.5 | 16 | 0.8 | 0.8 |
| Wide-angle X-ray diffraction peak intensity ratio | — | 2.6 | 2.8 | 2.9 | 1.3 | 3.2 | 3.3 |
| Penetration | dmm | 1 | 1 | 3 | 20 | 4 | 6 |
| Amount of terminal unsaturated group (vinylidene) | Number/1000 carbons | 2.5 | 3.0 | 3.1 | <0.1 | 3.2 | 3.5 |
| Mw/Mn | — | 3.66 | 3.72 | 3.23 | 2.33 | 2.46 | 2.24 |

Example 4

To 100 parts by mass of the binder resin C-1, 6 parts by mass of carbon black (MA100; manufactured by Mitsubishi Chemical Corporation), 2.5 parts by mass of the propylene/1-butene copolymer obtained in Example 1, 0.5 part by mass of a charge regulator (T-77; manufactured by Hodogaya Chemical Co., Ltd.) were added. These were mixed with a Henschel mixer. The mixture was kneaded by using a biaxial kneading machine (PCM-30, manufactured by Ikegai Corp) with the resin temperature at the discharge part of the biaxial kneading machine being 120° C. and the residence time being 30 seconds. This was followed by cooling, pulverizing and classification, to thereby give a toner T-1. The resultant toner T-1 was used to evaluate low-temperature fixability, offset resistance and storage property. Results are shown in Table 3.

Example 5

A toner T-2 was obtained in the same manner as in Example 4, except that the propylene/1-butene copolymer used in Example 4 was replaced with the propylene/1-butene copolymer obtained in Example 2.

The resultant toner T-2 was used to evaluate low-temperature fixability, offset resistance and storage property. Results are shown in Table 3.

Example 6

A toner T-3 was obtained in the same manner as in Example 4, except that the propylene/1-butene copolymer used in Example 4 was replaced with the propylene/1-butene copolymer obtained in Example 3.

The resultant toner T-3 was used to evaluate low-temperature fixability, offset resistance and storage property. Results are shown in Table 3.

Comparative Example 4

A toner T-4 was obtained in the same manner as in Example 4, except that the propylene/1-butene copolymer used in Example 4 was replaced with the propylene/ethylene copolymer obtained in Comparative Example 1.

The resultant toner T-4 was used to evaluate low-temperature fixability, offset resistance and storage property. Results are shown in Table 3.

Comparative Example 5

A toner T-5 was obtained in the same manner as in Example 4, except that the propylene/1-butene copolymer used in Example 4 was replaced with the propylene/1-butene copolymer obtained in Comparative Example 2.

The resultant toner T-5 was used to evaluate low-temperature fixability, offset resistance and storage property. Results are shown in Table 3.

Comparative Example 6

A toner T-6 was obtained in the same manner as in Example 4, except that the propylene/1-butene copolymer used in Example 4 was replaced with the propylene/1-butene copolymer obtained in Comparative Example 3.

The resultant toner T-6 was used to evaluate low-temperature fixability, offset resistance and storage property. Results are shown in Table 3.

TABLE 3

| | Example 4 | Example 5 | Example 6 | Comparative Example 4 | Comparative Example 5 | Comparative Example 6 |
|---|---|---|---|---|---|---|
| Toner fixability | BB | AA | AA | CC | DD | CC |
| Toner storage stability | AA | AA | BB | DD | CC | CC |
| Toner offset resistance | AA | AA | BB | BB | AA | BB |

The invention claimed is:

1. A propylene/α-olefin copolymer (A) comprising 60 to 90 mol % of structural units derived from propylene (a) and 10 to 40 mol % of structural units derived from α-olefins having 4 or more carbon atom (b) wherein (a)+(b)=100 mol %, the propylene/α-olefin copolymer (A) satisfying the following requirements (i) to (iv):

(i) A weight average molecular weight (Mw) as measured by GPC is 3,000 to 40,000;
(ii) A melting point (Tm) as measured by DSC is 60 to 90° C.;
(iii) A half width of a melting point peak as measured by DSC is 1 to 20° C.; and
(iv) A number of vinylidene groups per 1000 carbon atoms as measured by $^1$H-NMR is 0.5 to 5/1000 carbons.

2. The propylene/α-olefin copolymer (A) according to claim 1, which has (iv) ΔH of a melting peak as measured by DSC that is in the range of 40 to 100 J/g.

3. The propylene/α-olefin copolymer (A) according to claim 1, wherein the number of vinylidene group per 1000 carbon atoms as measured by $^1$H-NMR (v) is 1 to 5/1000 carbons.

4. The propylene/α-olefin copolymer (A) according to claim 1, which has a ratio of a peak width A (° C.) at a ¼ position of the height from the base line to a peak width B (° C.) at a ¾ position of the height from the base line of a melting point peak as measured by DSC that is in the range of 2 to 5.5.

5. The propylene/α-olefin copolymer (A) according to claim 1, which has a crystallinity as measured by X-ray diffraction that is in the range of 40 to 70%.

6. The propylene/α-olefin copolymer (A) according to claim 1, which has a peak intensity ratio as determined by small-angle X-ray diffraction that is in the range of 0.5 to 10, wherein the peak intensity ratio is a ratio of a scattering intensity observed when 2θ is 0.25° and a scattering intensity observed when 2θ is 0.75°.

7. The propylene/α-olefin copolymer (A) according to claim 1, which has a peak intensity ratio as determined by wide-angle X-ray diffraction that is in the range of 1.5 to 4, wherein the peak intensity ratio is a ratio of
a peak intensity attributed to polypropylene (110) surface observed when 2θ is in the range of from 11 to 15°, and
the lowest intensity observed at a valley between the peak attributed to polypropylene (110) surface and a peak attributed to polypropylene (040) surface observed when 2θ is in the range of from 15 to 18°.

8. The propylene/α-olefin copolymer (A) according to claim 1, wherein the propylene/α-olefin copolymer (A) is a copolymer obtained by pyrolyzing a copolymer (A-1) of propylene and an α-olefin having 4 or more carbon atoms.

9. The propylene/α-olefin copolymer (A) according to claim 8, wherein the propylene/α-olefin copolymer (A-1) comprises structural units derived from propylene (a') in an amount of 60 to 90 mol % and structural units derived from α-olefins having 4 or more carbon atom (b') in an amount of 10 to 40 mol % wherein (a')+(b')=100 mol %, the propylene/α-olefin copolymer (A-1) satisfying the following requirements (i') to (iii'):
(i') A weight average molecular weight (Mw) as measured by GPC is 50,000 to 1,000,000;
(ii') A melting point (Tm) as measured by DSC is 60 to 120° C.; and
(iii') A half width of a melting point peak as measured by DSC is 1 to 20° C.

10. An additive for a toner comprising the propylene/α-olefin copolymer (A) according to claim 1.

11. A toner comprising the propylene/α-olefin copolymer (A) according to claim 1.

12. A process for producing a propylene/α-olefin copolymer (A) according to claim 1, comprising pyrolyzing a copolymer (A-1) of propylene and an α-olefin having 4 or more carbon atoms, to give the propylene/α-olefin copolymer (A).

13. The process according to claim 12, wherein the copolymer (A-1) comprises structural units derived from propylene (a') in an amount of 60 to 90 mol % and structural units derived from α-olefins having 4 or more carbon atom (b') in an amount of 10 to 40 mol % wherein (a')+(b')=100 mol %, the propylene/α-olefin copolymer (A-1) satisfying the following requirements (i') to (iii');
(i') a weight average molecular weight (Mw) as measured by GPC is 50,000 to 1,000,000;
(ii') A melting point (Tm) as measured by DSC is 60 to 120° C.; and
(iii') A half width of a melting point peak as measured by DSC to 1 to 20° C.

* * * * *